Dec. 31, 1968   J. H. R. LEWIS   3,419,864
SPEED MEASURING APPARATUS
Filed Aug. 21, 1967
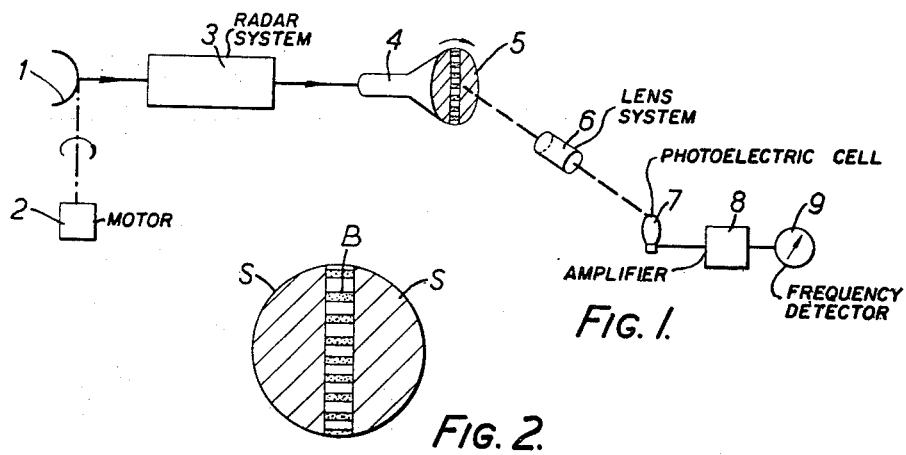
FIG. 1.
FIG. 2.
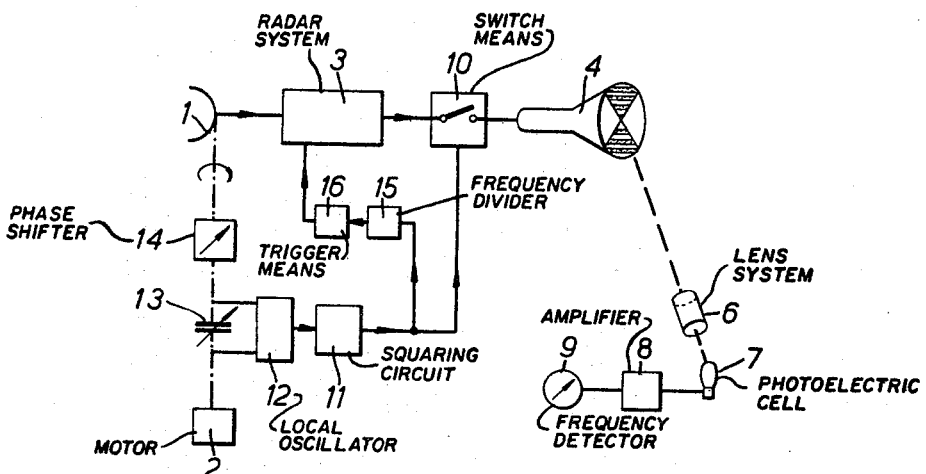
FIG. 3.
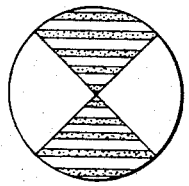
FIG. 4.
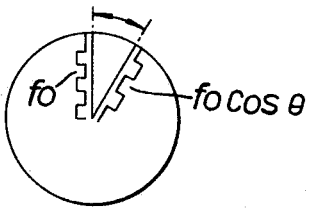
FIG. 5.
INVENTOR
John Henry Reginald Lewis
BY
Baldwin Wight Diller & Brown
ATTORNEYS

United States Patent Office 3,419,864
Patented Dec. 31, 1968

3,419,864
SPEED MEASURING APPARATUS
John Henry Reginald Lewis, Theydon Bois, Essex,
England, assignor to The Marconi Company
Limited, London, England, a British company
Filed Aug. 21, 1967, Ser. No. 661,967
Claims priority, application Great Britain, Aug. 23, 1966,
37,839/66
10 Claims. (Cl. 343—8)

ABSTRACT OF THE DISCLOSURE

Apparatus is known for measuring the speed of a moving member in relation to a reference point using a light source and a light cell which receives light reflected from the moving member. In such arrangements motion of the moving member modulates the light. In the invention a photo cell is subjected to light from a P.P.I. display in a tube having a graticuled mask on its face. In operation output from the cell is passed to a frequency meter which is calibrated to read speed and arranged to detect a major component of frequency derived from the movements of the display across the tube.

---

This invention relates to speed measuring apparatus and is for improvements in or modifications of the invention contained in the specification accompanying the copending United States application Ser. No. 558,098 of William Oliver Agar, assigned to the assignee of the instant invention.

The invention of the copending United States application is primarily, though not exclusively, intended for the measurement of speed in industrial processes. (Specific mention is made in the copending specification to the measurement of the speed of emergence of steel strip from a rolling mill and to the measurement of vehicle speeds.) According to the said copending invention an apparatus for measuring the speed or a moving member in relation to a reference point includes one or more light-electric translating devices; means for subjecting said device or devices to activation by light from a continuously changing area or areas of said member fixed in relation to the reference point; and means for causing the motion of said member in relation to said reference point to modulate the light reaching said device or devices at a rate dependent on the speed of said motion.

In the specific embodiments described and illustrated in the aforementioned copending specification the "moving member" whose relative speed is to be measured is an actual material member (e.g., a moving steel strip) but clearly this is not essential and the said "moving member" could be a mere picture, pattern or display of light and shade which moves in relation to a surface and the copending invention could be used to measure the relative speed of movement of that picture, pattern or display.

A particular case of a display which moves over a fixed surface and whose speed of movement in one or more predetermined chosen directions can be used to give important and valuable information is that of a P.P.I. radar display moving over a surface constituted by the screen of a display cathode ray tube. Thus, for example, in the case of an air-borne radar providing a P.P.I. display of an area of the ground, the display will of course give the slant ranges of the different targets included therein. These slant ranges will change as the aircraft moves over the ground, the display having one component direction of movement due to forward movement of the aircraft and a perpendicular component direction of movement due to sideways movement (drift) of the aircraft. In the case of targets which are far enough away for the differences between slant ranges and true horizontal ranges to be neglected, measurement of the speed of movement of the display in one component direction will give (sufficiently closely for practical purposes) the forward speed of the aircraft and measurement of the speed of movement of the display in the other component direction will similarly give (nearly enough) the drift speed. Even if the differences between slant ranges and true horizontal ranges are too great to be neglected, aircraft forward and drift speeds can be derived from measurement of the speeds of the appropriate component directions of movement of the display by applying compensating corrections, which will be apparent to those skilled in the art, to the measured speeds.

The present invention seeks to apply the copending invention in an improved manner to the obtaining of component direction speeds of movement of a P.P.I. radar display.

According to this invention a radar having a P.P.I. display is provided with means for combining with a predetermined part of said display a pattern of parallel regularly spaced lines extending over a predetermined area of said display and running in a predetermined direction; at least one light-electric translating device which is subjected to light from the combined display part and pattern; and frequency responsive means responsive to a major component of frequency which, when movement of the display occurs, will be present in the output from said device due to the presence of said pattern.

The pattern of lines may be provided by a graticule mask of lines placed over the display tube screen face. A preferred form of graticule mask comprises parallel opaque lines or bars spaced apart by transparent lines or bars of substantially the same width as the opaque lines, said mask being placed diametrically over the display. For measurement of component speed in the forward direction the graticule mask is so oriented in relation to the display that the lines or bars run at right angles to the ahead direction in the display. For measurement of component speed in the abeam direction (component speed of movement due to drift) the graticule mask is oriented perpendicularly to the foregoing, i.e., with the lines or bars running at right angles to the abeam direction in the display. A rotatably mounted graticule mask is preferably employed so that, by rotating the mask through 90° it may be used at will either to derive the forward component of speed of movement of the display or the abeam component.

In another way of carrying out the invention the pattern of lines or bars is obtained without the use of a mask and purely electronically by gating or blanking the radar video signal fed to the display cathode ray tube during the substantially radial deflection at a frequency which is substantially constant during each such deflection but is varied automatically as a function of variation of the substantially radial deflection direction during required arcs of azimuth deflection. Preferably the gating during said arcs is effected by a square wave gating or blanking signal of the form $f_\theta = f_0 \cos \theta$ where $\theta$ is the angle, with reference to a datum radial direction of the radial deflection in the display tube and $f_0$ is the gating or blanking frequency applied during deflection in said datum direction. The datum direction will be in one direction for the case in which lines or bars running in the abeam direction are required and in a direction at right angles thereto for the case in which lines or bars running in the ahead direction are required. Obviously lines or bars running in the abeam direction may be obtained during two diametrically opposite sectors of azimuth scanning, while lines or bars running in the ahead direction may be obtained during two other diametrically opposite sectors of azimuth scanning.

Preferably the gating or blanking signal is generated by an oscillator having a frequency determining inductance-capacitance resonant circuit the capacitance of which is variable and is varied automatically by mechanical or electrical ganging with the rotation of the azimuth scanning aerial of the radar. It may be shown that the required law of variation of the capacitance C of the condenser is $C=C_0(1+\tan^2\theta)$ where $\theta$ is the azimuth angle swept out in a predetermined arc of azimuth by the radar aerial from a datum azimuth direction and $C_0$ is the value of the capacitance corresponding to the datum direction. It may also be shown that, if $\theta$ has a maximum value of $\pm 45°$ the capacitance change required is $2C_0$, the capacitance change being $C_0$.

As will now be appreciated the gating or blanking frequency $f_0$ causes the production in the display of the lines or bars the presence of which results in the speed dependent major component frequency which is measured to ascertain speed. The lines or bars of the graticule mask used in the first described way of carrying out the invention perform the same function. The speed dependent frequency $f_v$ corresponding to a given speed $v$ depends on the value of $f_0$ in the one case and the number of mask lines or bars in the other. The governing relation is $$f_v/f_0 = 2v/C$$

where $c$ is the speed of propagation of electromagnetic waves in space. If therefore the radar is carried by an aircraft with a forward speed of approximately 300 knots $f_v/f_0=10^{-6}$. In practice $f_0$ (in the case where the lines or bars are produced electronically) and the number of lines or bars (in the case where a mask is used) are chosen at as high a value as practical in order that $f_v$ may be of a value which is convenient to measure.

It may also be shown that optimum signal/noise ratio is obtained when the average duration of a radar echo signal is equal to a half cycle of the frequency $f_0$. The minimum duration of an echo may be taken as equal to the duration $t_p$ of a transmitted pulse. Accordingly best results, as respects choice of $f_0$, are obtained by making $$f_0 = 1/2t_p$$

The start of the modulation $f_0 \cos \theta$ on the radar radial scan must be phase locked with the rotation of the aerial in azimuth and this requirement is best satisfied by triggering the radar pulse transmitter to transmit pulses under the control of a frequency derived from and related to $f_0 \cos \theta$.

It will now be appreciated that the embodiments above described in effect integrates all radar echoes received to provide a frequency representative of average velocity of movement. In the case of an airborne radar, aircraft speed (and/or drift) is thus obtainable. In the case of a ground radar there may be a number of targets moving at different speeds in the display and the average speed obtained as described may therefore not indicate anything useful. However the invention may be usefully applied even in the case of a ground radar by providing a gating "strobe" to be placed round a particular echo (in manner known per se under the control of a human operator) and the invention used to measure the speed of that echo, the measurement being used, if required, to control the strobe to "track" the chosen echo.

Speed measuring radars, usually Doppler radars, are, of course, well known. They are, however, expensive. Nowadays many aircraft are already equipped with navigation aiding radars having P.P.I. displays for "watching" the terrain over which the aircraft is flying. An importing practical advantage of the invention is that it enables such a radar, which does not normally incorporate speed measuring equipment, to be modified by the addition of comparatively simple and cheap apparatus which enables it to be used, when required, for speed measurement.

The invention is illustrated in the accompanying drawings in which FIGURE 1 is a simplified schematic diagram of one embodiment employing a graticule mask; FIGURE 2 shows a preferred form of the mask used in FIGURE 1; FIGURE 3 is a simplified schematic diagram of an embodiment which will operate purely electronically and without a mask; and FIGURES 4 and 5 are explanatory figures related to FIGURE 3.

Referring to FIGURE 1, the transmitting-receiving directional aerial 1 of a pulsed radar is continuously rotated in azimuth by an electric motor 2. It receivves pulses for transmission and supplied received echo pulses to a radar equipment represented by the block 3. The radar equipment operates a P.P.I. display tube 4. As so far described the apparatus is a normal pulsed radar with a P.P.I. display and may be of any suitable form well known per se. It is, of course, shown in much simplified schematic manner. Over the screen end of the tube is placed when required, a mask 5 (shown to a larger scale in FIGURE 2) which is centred on the display and is rotatably mounted. The mask has a diammetrical strip B with opaque and transparent lines which alternate and are of the same width, running across the strip at right angles to the centre line thereof. Light from the P.P.I. display, as "seen" through the strip, is projected by a simple suitable lens system 6 upon a photo-electric cell 7 which feeds into an amplifier 8 which in turn feeds into a frequency meter 9 which may be calibrated directly in speed. The cell 7 is protected from light from the parts of the display to the sides of the lined strip. As shown this is done, in the case of the illustrated mask, by providing it with opaque side pieces S covering those parts. To see the display fully, therefore, the mask must be removed but if such an arrangement is undersirable any suitable optical system may be used at any convenient position to ensure that the cell 7 receives light from only the strip B and the part of the display beneath it. The meter 9 is, for simplicity of drawing, indicated as though it were an ordinary needle type frequency meter but in practice it would be a counter. If, with the mask 5 oriented as shown, the meter reads forward speed, it will read drift speed if the mask is rotated through 90°. If the mask is rotated until (for a given air speed of the aircraft, assuming an airborne radar) the meter reading is a maximum, the angle to which the mask has been rotated will correspond with the course "made good" over the ground.

In the modification shown schematically in FIGURE 3 a graticule mask is dispensed with and the required pattern of lines and bars is obtained purely electronically. The parts referenced 1, 2, 3, 4, 6, 7, 8 and 9 are as in FIGURE 1, in FIGURE 3, however, the radar video signals supplied to the display tube 4 by the radar equipment 3 are blanked or gated by an electronic switch 10 of any known suitable form. This switch is actuated by a square wave form of the frequency $f_0 \cos \theta$ obtained from squaring circuit 11 connected to square the oscillations from a local oscillator 12. This oscillator has a parallel tuned circuit as its frequency determining circuit and the condenser 13 thereof is a variable condenser having a capacitance ratio (maximum to minimum) of 2:1. Its variation is mechanically or electrically ganged with the azimuth rotation of the aerial 1 and the drive (electrical or mechanical) between 1 and 13 includes an adjustable phase shifter 14 by means of which the phase relation between 1 and 13 may be altered, when required, by 90°. In one position of the phase shifter the condenser is of such value that, when the aerial 1 is "looking" directly ahead, the frequency of the oscillator is $f_0$. In this position of the phase shifter the direct ahead direction is the datum direction. The law of variation of the capacitance C of the condenser is:

$$C=C_0(1+\tan^2\theta)$$

where $\theta$ is the angle through which the aerial has turned from the datum direction and the condenser is arranged to change from maximum to minimum capacitance and back again in 90° of aerial rotation. The freqeuncy from the generator is therefore $f_o=f_0 \cos \theta =$ (in the datum direction and in directions at 90° and 180° thereto) $f_0$. The varying frequency square wave from 11 blanks the radar video signals to the tube 4 during each radial deflection and as shown conventionally in FIGURE 5 for two directions one of which is the datum. The result obtained is to blank off the display with parallel bars in two diametrically opposite sectors as shown conventionally on the tube representation in FIGURE 3 and, rather better and to a larger scale, in FIGURE 4. By operating the phase shifter 14 to produce a change of phase relation of 90° the double sector bar pattern can be rotated through 90°, i.e., the datum direction can be swung 90°. With the phase shifter set to obtain the first datum direction the meter 9 will read forward speed: with the phase shifter set to obtain the second datum direction, the meter 9 reads drift speed. In order to obtain good phase locking between the gating frequency generated by oscillator 12 and the start of the radar radial scan the radar pulse transmission is triggered by a frequency derived from $f_0 \cos \theta$. In FIGURE 3 this is done by feeding output from the squarer 11 to a counter or other frequency divider 15 the divided output from which triggers by means of a trigger circuit 16 the pulse transmitter included in the equipment 3 and also, of course, the start of each radial scan. To quote practical figures, if $f_0$ is of the order of 1 mc./s. the division ratio of 15 might be 1000.

It will be seen that, in both FIGURES 1 and 3, the radar proper (comprised of the parts 1, 2, 3 and 4) is an ordinary pulsed P.P.I. radar such as might well already be provided—for example, in an aircraft—for other purposes, and that, in both cases, the added apparatus provided in order to enable the same radar to be used for speed and/or drift determination is of a simple and inexpensive nature costing far less than a Doppler radar would do.

The specification accompanying the inventor's copending United States application Ser. No. 661,966 described a speed measuring apparatus which is in many respects similar to those described herein. The invention in the two specifications are however distinct from one another in that, in the present specification, speed information is derived from the movements of a P.P.I. display across the screen of a display tube whereas in the inventor's copending specification such information is obtained directly from the radar video signals.

I claim:
1. A radar which has a P.P.I. display including means for combining with a predetermined part of said display a pattern of parallel regularly spaced lines extending over a predetermined area of said display and running in a predetermined direction: at least one light-electric translating device which is subjected to light from the combined display part and pattern; and frequency responsive means responsive to a major component of frequency which when movement of the display occurs will be present in the output from said device due to the presence of said pattern.

2. A radar as claimed in claim 1 including a display tube and wherein the pattern of lines is provided by a graticule mask of lines placed over the display tube screen face.

3. A radar as claimed in claim 2 wherein the graticule mask comprises parallel opaque lines or bars spaced apart by transparent lines or bars of substantially the same width as the opaque lines, said mask being placed diametrically over the display.

4. A radar as claimed in claim 3 wherein the graticule mask is rotatably mounted, whereby by rotating the mask through 90° it may be used at will either to derive the forward component of speed of movement of the display or the abeam component.

5. A radar as claimed in claim 1 including a display tube and gating or blanking means for electronically obtaining said pattern of lines by gating or blanking the radar video signal fed to the display cathode ray tube during the substantially radial deflection at a frequency which is substantially constant during each such deflection but is varied automatically as a function of variation of the substantially radial deflection direction during required arcs of azimuth deflection.

6. A radar as claimed in claim 5 wherein gating or blanking means includes means for providing a square wave gating or blanking signal of the form $f_c = f_0 \cos \theta$ where $\theta$ is the angle, with reference to a datum radial direction of the radial deflection in the display tube and $f_0$ is the gating or blanking frequency applied during deflection in said datum direction.

7. A radar as claimed in claim 6 including means for obtaining lines or bars running in the abeam direction during two diametrically opposite sectors of azimuth scanning and for obtaining lines or bars running in the ahead direction during two other diametrically opposite sectors of azimuth scanning.

8. A radar as claimed in claim 7 wherein said means for providing a square wave gating or blanking signal includes an oscillator having a frequency determining inductance-capacitance resonant circuit the capacitance of which is variable, said radar including an azimuth scanning aerial, the rotation of the azimuth scanning aerial of the radar being ganged with said variable capacitance for automatically varying said capacitance.

9. A radar as claimed in claim 8 wherein the gating or blanking frequency $f_0$ provided by said oscillator and the duration $t_p$ of the transmitted radar pulse provided by said radar at least approximately satisfy the equation $f_0 = \frac{1}{2} t_p$.

10. A radar as claimed in claim 9 including means for phase locking the start of the modulation on the radar radial scan with the rotation of the aerial in azimuth by triggering the radar pulse transmitter to transmit pulses under the control of a frequency derived from and related to the oscillator output frequency.

References Cited
UNITED STATES PATENTS 2,493,755  1/1950  Ferrill.
2,526,682  10/1950  Mulberger et al. _____ 343—9

RODNEY D. BENNETT, *Primary Examiner.*

C. L. WHITHAM, *Assistant Examiner.*

U.S. Cl. X.R.
343—9